(12) United States Patent
Shuster

(10) Patent No.: US 8,818,855 B2
(45) Date of Patent: Aug. 26, 2014

(54) SYSTEM AND METHOD FOR AGGREGATING INFORMATION OVER A WIDE AREA NETWORK

(75) Inventor: Brian Mark Shuster, Stateline, NV (US)

(73) Assignee: Intellectual Ventures I LLC, Wilmington, DE (US)

( * ) Notice: Subject to any disclaimer, the term of this patent is extended or adjusted under 35 U.S.C. 154(b) by 2704 days.

(21) Appl. No.: 09/837,071

(22) Filed: Apr. 18, 2001

(65) Prior Publication Data

US 2001/0056371 A1    Dec. 27, 2001

Related U.S. Application Data

(60) Provisional application No. 60/197,715, filed on Apr. 18, 2000.

(51) Int. Cl.
*G06Q 30/02* (2012.01)
*G06F 15/16* (2006.01)

(52) U.S. Cl.
USPC ........................................ 705/14.4; 709/203

(58) Field of Classification Search
CPC .............. G06Q 30/0241; G06F 15/16; G06F 17/30867
USPC ................... 705/14, 14.4; 709/203
See application file for complete search history.

(56) References Cited

U.S. PATENT DOCUMENTS

| | | | | |
|---|---|---|---|---|
| 5,226,177 A | * | 7/1993 | Nickerson | 725/24 |
| 5,754,938 A | * | 5/1998 | Herz et al. | 725/116 |
| 5,822,523 A | * | 10/1998 | Rothschild et al. | 709/236 |
| 6,029,195 A | * | 2/2000 | Herz | 725/116 |
| 7,752,251 B1 | * | 7/2010 | Shuster et al. | 709/200 |
| 2001/0056371 A1 | * | 12/2001 | Shuster | 705/14 |

OTHER PUBLICATIONS

Define: system layer—Google Search downloaded Jan. 16, 2009.*

* cited by examiner

*Primary Examiner* — Donald L. Champagne

(57) ABSTRACT

A system and method is provided for aggregating information from a plurality of remote information systems, such as bulletin boards, over a wide area network, such that a reception device operating on an aggregated information system can receive message data contained on the plurality of remote information systems. In a preferred embodiment of the present invention an aggregating application operating on the aggregated information system is adapted to retrieve original message data (OMD), such as a previously posted new message, and response message data (RMD), such as a previously posted response message, from a plurality of remote information systems. This retrieved message data (i.e., OMD, RMD) can then be provided to at least one reception device communicating with the aggregated information system. In another embodiment of the present invention, the aggregating application is further adapted to receive additional original message data (AOMD), such as a new message, and additional response message data (ARMD), such as a response message responding to a previously posted message, from the at least one reception device. This received message data (i.e., AOMD, ARMD), along with the retrieved message data (i.e., OMD, RMD), is then provided to the plurality of remote information systems along with advertisement data, such that it can be provided to any additional reception devices communicating with the plurality of remote information systems.

28 Claims, 4 Drawing Sheets

SYSTEM AND METHOD FOR AGGREGATING INFORMATION OVER A WIDE AREA NETWORK

CROSS-REFERENCE TO RELATED APPLICATION

This application claims priority pursuant to 35 U.S.C. §119 (e) to U.S. Provisional Application No. 60/197,715, filed Apr. 18, 2000, which application is specifically incorporated herein, in its entirety, by reference.

BACKGROUND OF THE INVENTION

1. Field of the Invention

The present invention relates to aggregating information over a wide area network and, more particularly, to a system and method for aggregating information from a plurality of remote information systems, such as bulletin boards, over a wide area network, such that a reception device operating on an aggregated information system can receive message data contained on the plurality of remote information systems.

2. Description of Related Art

Wide area networks, such at the Internet, are commonly used to exchange information between individuals. To further this exchange of information, on-line information systems, such as bulletin boards, have been established to allow an individual to gather and disseminate information. Bulletin boards are typically geared toward a particular topic, where like-minded individuals can come to post new messages or browse and reply to previously posted messages. For example, a bulletin board may provide a forum for individuals to discuss "architectural software." Thus, an individual interested in this specific topic, could visit the architectural software bulletin board and communicate with other like-minded individuals by posting new messages or browsing and replying to previously posted messages. Not only does such a service allow for topical information to be exchanged, but it allows for such information to be exchanged shortly after it has been posted.

The main problem associated with on-line information systems, such as bulletin boards, is the high number of on-line information systems that are available over wide area networks, such as the Internet. As the Internet rapidly grows in size, so does the number of on-line information systems. Thus, if an individual searches for a bulletin board geared toward a particular topic, that individual may be presented with hundreds, if not thousands of bulletin boards containing topical information. By participating with only one of these bulletin boards, not only does the individual miss relevant information contained on the other bulletin boards, but the individual also misses the opportunity to communicate with like-minded individuals that are simultaneously communicating on the other bulletin boards. For example, if the architecturally-minded individual, referred to above, searched for a bulletin board geared toward "home design software," he may be provided with hundreds of bulletin boards containing "architecture," "home design," and "software" information. Thus, in order to gather all the relevant on-line information pertaining to "home design software," the individual would have to visit hundreds of bulletin boards, sift through the posted messages at each bulletin board, post an inquiring message at each bulletin board, and then revisit each bulletin board to see if anyone has replied to his previously posted inquiry. Such a process is not only time consuming, but also ineffective, since it is virtually impossible to locate all the bulletin boards containing information pertaining to a particular topic, such as "home design software."

Thus, a need and a desire exists to have an aggregated information system that allows an individual to receive topical messages from a plurality of on-line information systems at one central location.

SUMMARY OF THE INVENTION

The present invention provides a system and method for aggregating information from a plurality of remote information systems, such as bulletin boards, over a wide area network, such that a reception device operating on an aggregated information system can receive message data contained on the plurality of remote information systems. In a preferred embodiment of the present invention, an aggregated assembly includes an aggregated information system, a plurality of remote information systems, and a plurality of reception devices communicating through a wide area network, such as the Internet. The aggregated information system further includes a memory device, a server, and an aggregating application adapted to aggregate information from the plurality of remote information systems.

A prior art remote information system, such as a bulletin board, is adapted to communicate with a plurality of reception devices through a wide area network, such as the Internet. More particularly, the remote information system is adapted to provide a reception device with original message data (OMD), such as a previously posted new message, and response message data (RMD), such as a previously posted response to a new message. The remote information system is further adapted to receive original message data (OMD), such as a new message, and response message data (RMD), such as a response to a previously posted new message, from a reception device. The problem with such a prior art system is that multiple reception devices are often posting on multiple remote information systems, thus making it impossible for the multiple reception devices to communicate with one another.

In the present invention, the aggregated information system aggregates information from a plurality of remote information systems, such that the aggregated information can be provided to at least one reception device communicating with the aggregated information system. An aggregating application operating on the aggregated information system is adapted to retrieve original message data (OMD), such as a previously posted new message, and response message data (RMD), such as a previously posted response message, from the plurality of remote information systems. This retrieved message data can then be provided to the at least one reception device communicating with the aggregated information system. This allows the at least one reception device to view message data that was previously posted on the aggregated information system, as well as message data that was previously posted on the plurality of remote information systems.

In another embodiment of the present invention, the aggregating application is further adapted to receive additional original message data (AOMD), such as a new message, and additional response message data (ARMD), such as a response message responding to a previously posted message, from the at least one reception device. This received message data (i.e., AOMD, ARMD), along with the retrieved message data (i.e., OMD, RMD), is then provided to the plurality of remote information systems such that it can be provided to any additional reception devices communicating with the plurality of remote information systems. This allows the additional reception devices to view message data that was previously post on any one of the plurality of remote information systems, as well as message data that was previously posted on the aggregated information system. Not only does such a system provide individual reception devices with additional message data, but it also allows any reception devices communicating with the plurality of information systems (i.e., remote information systems and the aggregated information system) to communicate with one another by posting and receiving message data.

In another embodiment of the present invention, the aggregating application is further adapted to add advertisement data to the message data before it is sent to any one of the remote information systems. In this embodiment, the advertisement data includes, but is not limited to, static advertisement data and active advertisement data, where the active advertisement data provides an interacting user with additional advertisement data.

A more complete understanding of the system and method for aggregating information over a wide area network will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF THE PREFERRED EMBODIMENT

The present invention provides a system and method for aggregating information from a plurality of remote information systems, such as bulletin boards, over a wide area network, such that a reception device operating on an aggregated information system can receive message data contained on the plurality of remote information systems. In the detailed description that follows, like element numerals are used to describe like elements illustrated in one or more figures.

Figure 1:
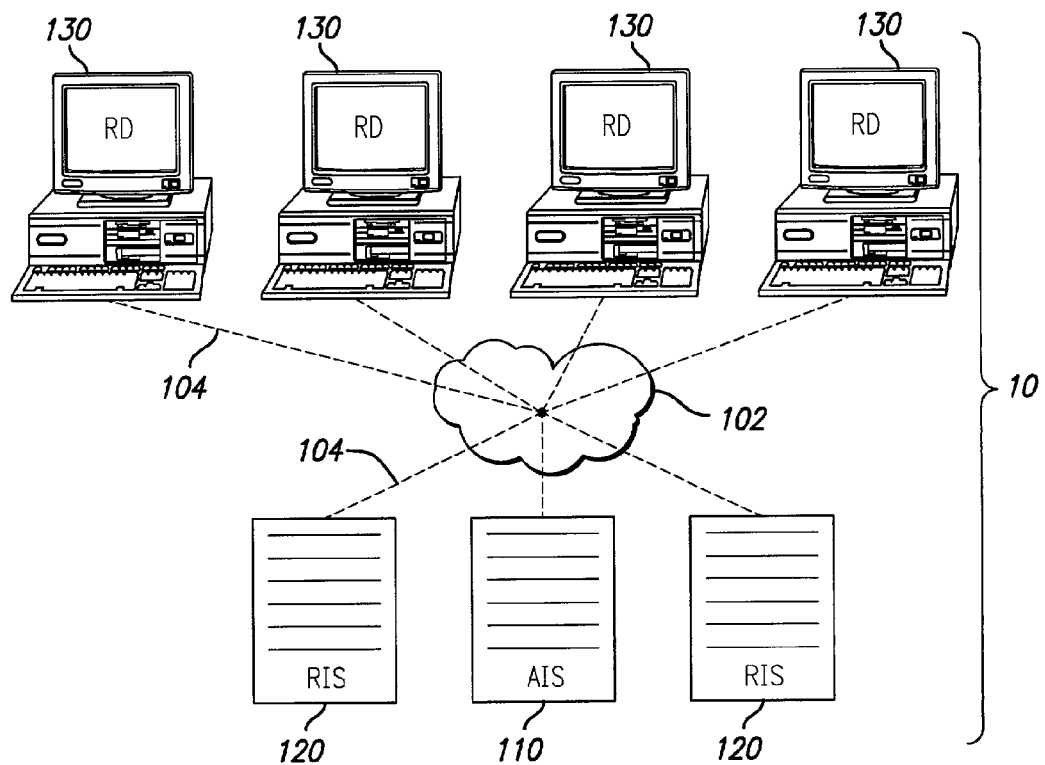
FIG. 1 illustrates a system layer of the preferred embodiment of an aggregated information system of the present invention.

Preferred embodiments of the present invention operate in accordance with a plurality of reception devices, a plurality of remote information systems, and an aggregated information system adapted to communicate with the plurality of remote information systems and reception devices. FIG. 1 illustrates a system layer of an aggregated information system of the present invention. In the preferred embodiment, an aggregated assembly 10 includes an aggregated information system 110, a plurality of remote information systems 120, and a plurality of reception devices 130 communicating through a wide area network 104, such as the Internet 102. It should be appreciated that the reception devices 130 depicted in FIG. 1 include, but are not limited to, personal computers, set top boxes, televisions, personal digital assistances (PDAs), mobile phones, and all other physically and wirelessly connected reception devices generally known to those skilled in the art. It should further be appreciated that the number of reception devices 130 and remote information systems 120 depicted in FIG. 1 are merely to illustrate how the present invention operates, and are not intended to further limit the present invention.

Figure 2:
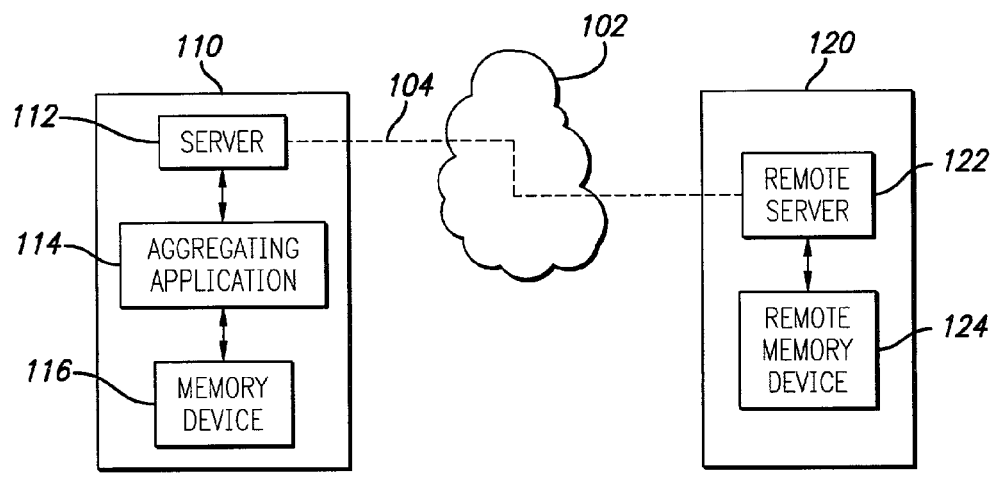
FIG. 2 is a block diagram of the aggregated information system and the remote information system depicted in FIG. 1.

The aggregated information system 110 and the remote information system 120 are shown in greater detail in FIG. 2. Specifically, the aggregated information system 110 further includes a memory device 116, a server 112, and an aggregating application 114 adapted to aggregate information from the plurality of remote information systems 120. Each remote information system 120 further includes a remote memory device 124 and a remote server 122 adapted to communicate with the server 112 via a wide area network 104, such as the Internet 102. It should be appreciated that the memory devices 116, 124 depicted in FIG. 2 include, but are not limited to, RAM, cache memory, flash memory, magnetic disks, optical disks, removable disks, SCSI disks, IDE hard drives, tape drives, smart cards, and all other types of data storage devices (and combinations thereof, such as RAID devices) generally known to those skilled in the art. It should also be appreciated that the aggregating application 114 depicted in FIG. 2 may exist as a single application, or as multiple applications (locally and/or remotely stored) that operate together to perform the aggregating functions as described below. It should further be appreciated that the number of components (i.e., server 112, aggregating application 114, memory device 116, remote server 122, and remote memory device 124) depicted within the aggregated information system 110 and the remote information system 120 are merely to illustrate how the invention operates, and are not intended to further limit the invention. Thus, an aggregated information system 110 or a remote information system 120 containing a greater number of (or additional) components is within the spirit and scope of this invention.

Figure 3:
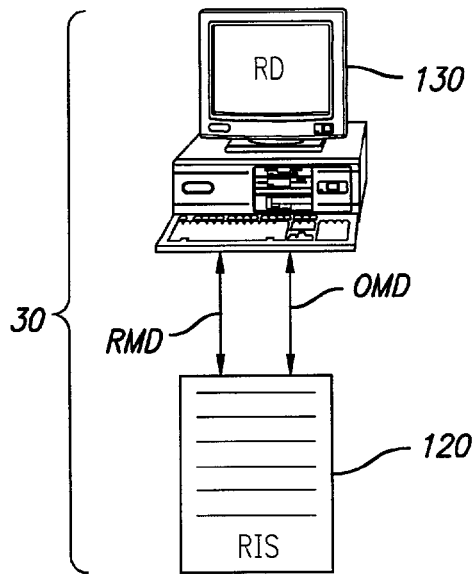
FIG. 3 illustrates a communication layer of a typical remote information system of the prior art

In order to best describe the preferred embodiment of the present invention, the configuration and operation of a prior art remote information system will first be described. A prior art remote information system can best be described by referring to FIGS. 1, 2, and 3, where FIG. 3 illustrates a communication layer of a prior art remote information system 120. Referring first to FIG. 1, a traditional remote information system 120, such as a bulletin board, is adapted to communicate with a plurality of reception devices 130 through a wide area network 104, such as the Internet 102. More particularly, the remote information system 120 is adapted to receive original message data (OMD), such as a new message, from at least one of the plurality of reception devices 130. This new message is then stored on a remote memory device 124 (see FIG. 2) operating on the remote information system 120, such that it can be provided to at least one other one of the plurality of reception devices 130 upon request. The remote information system 120 is further adapted to receive response message data (RMD), such as a response message responding to the previously posted new message, from at least one of the plurality of reception devices 130. The response message is also stored on the remote memory device 124 (see FIG. 2), such that it can be provided to at least one other one of the plurality of reception devices 130 upon request.

The level of communication of a typical remote information system can best be seen by viewing FIG. 3, which illustrates a communication layer of a prior art remote information system 120. A remote assembly 30 includes a reception device 130 and a remote information system 120. Once the reception device 130 has established communication with the remote information system 120, the reception device 130 may be provided with original message data (OMD), such as a previously posted new message, or response message data (RMD), such as a previously posted response message. The reception device 130 can then submit original message data (OMD), such as a new message, or response message data (RMD), such as a response message responding to the previously posted new message. The problem with such a prior art remote information system 120 is that other reception devices (not shown) communicating with other remote information systems (not shown) cannot communicate (e.g., by sharing information) with the reception device 130 without first interfacing with the remote information system 120, which requires knowledge of the remote information system 120, as well as time to interface with the remote information system 120.

Figure 4:
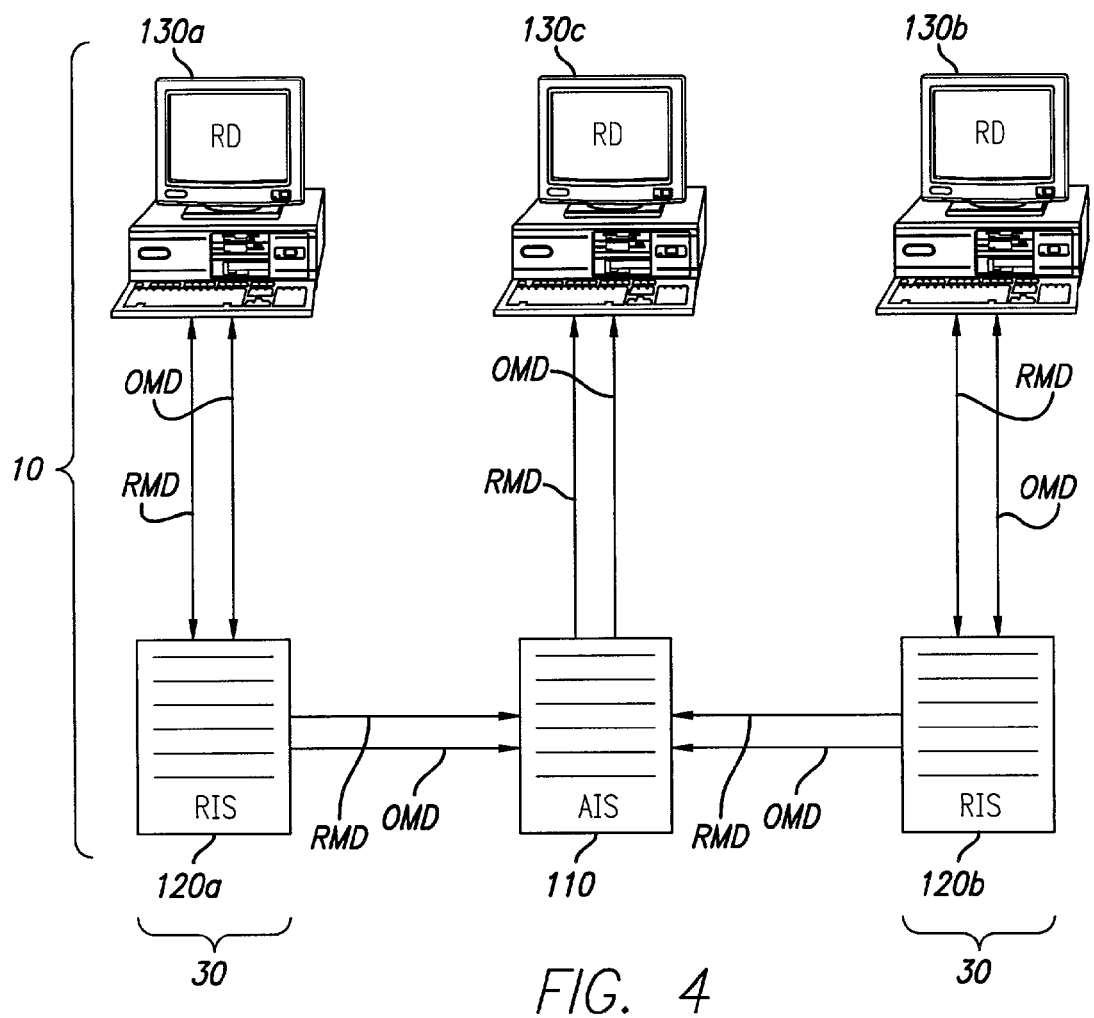
FIG. 4 illustrates a communication layer of the preferred embodiment of the aggregated information system of the present invention.

FIG. 4 illustrates a communication layer of the preferred embodiment of the aggregated information system of the present invention. The aggregated assembly 10 includes an aggregated information system 110, a communicating reception device 130c, and a plurality of remote assemblies 30 operating as previously described (i.e., providing and receiving original message data (OMD) and response message data (RMD) to and from corresponding reception devices (e.g., 130a, 130b)). The aggregating application 114 (see FIG. 2) operating on the aggregated information system 110 is adapted to retrieve original message data (OMD), such as previously posted new messages, and response message data (RMD), such as response messages responding to previously posted new messages, from the remote information systems 120a, 120b. The original message data (OMD) and the response message data (RMD) is then stored on a memory device 116 (see FIG. 2) operating on the aggregated information system 110. The stored message data (i.e., OMD, RMD) can then be provided to the communicating reception device 130c upon request.

To further illustrate how the preferred embodiment of the aggregated information system 110 may operate within the aggregated assembly 10, the following illustrative example is provided. Referring to FIG. 4, two reception devices 130a, 130b are communicating with corresponding remote information systems 120a, 120b. During this communication, the two reception devices 130a, 130b may be provided with previously posted new messages (i.e., OMD) and responses to those new messages (i.e., RMD). Also during this communication, the two reception devices 130a, 130b may be allowed to post new messages (i.e., OMD) and responses (i.e., RMD) to previously posted messages. This form of providing and receiving message data is consistent with typical bulletin boards found in the prior art.

In the present invention, the aggregated information system 110 also communicates with these remote information systems 120a, 120b, as well as at least one communicating reception device 130c. The aggregating application 114 (see FIG. 2) operating on the aggregated information system 110 is adapted to retrieve the previously posted new messages (i.e., OMD) and the previously posted response messages (i.e., RMD) contained on the remote information systems 120a, 120b, regardless of whether those messages were posted by the reception devices 130a, 130b or some other reception device (not shown). These retrieved messages (i.e., OMD, RMD) can then be provided to the communicating reception device 130c. This allows the communicating reception device 130c to view message data (i.e., OMD, RMD) that was previously posted on the remote information systems 120a, 120b, as well as message data that was previously posted on the aggregated information system 110.

Figure 5:
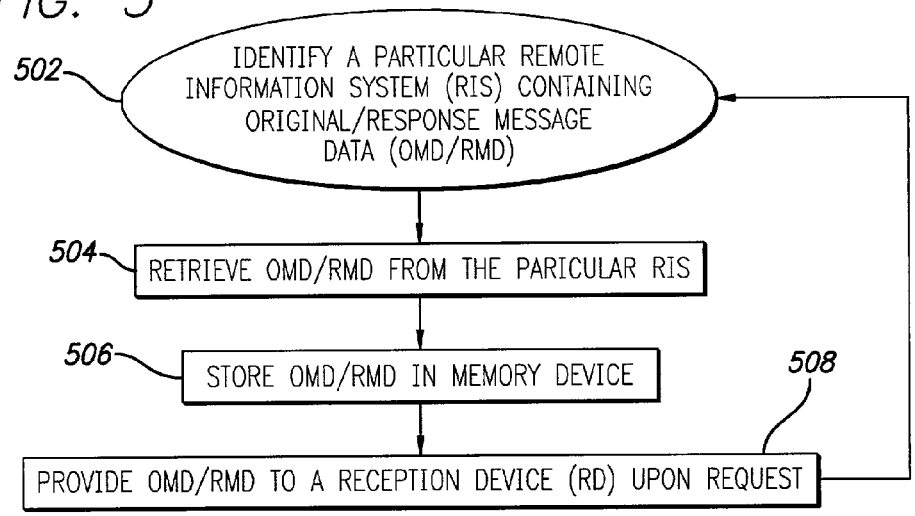
FIG. 5 is a flow diagram illustrating how the aggregated information system depicted in FIG. 4 receives and provides message data.

FIG. 5 is a flow chart illustrating how the aggregating application 114 operating on the aggregated information system 110 can be used to communicate with at least one reception device 130 and a plurality of remote information systems 120. At step 502, the aggregating application identifies a relevant remote information system (RIS) that may contain original message data (OMD) or response message data (RMD). Once the remote information system is identified, then the aggregating application (or search application, as described below) can search for, and retrieve relevant original message data (OMD) or relevant response message data (RMD) at step 504. Once the message data (i.e., OMD, RMD) has been received, it is stored at step 506 in the memory device operating on the remote information system, and then provided at step 508 to the communicating reception device.

Figure 6:
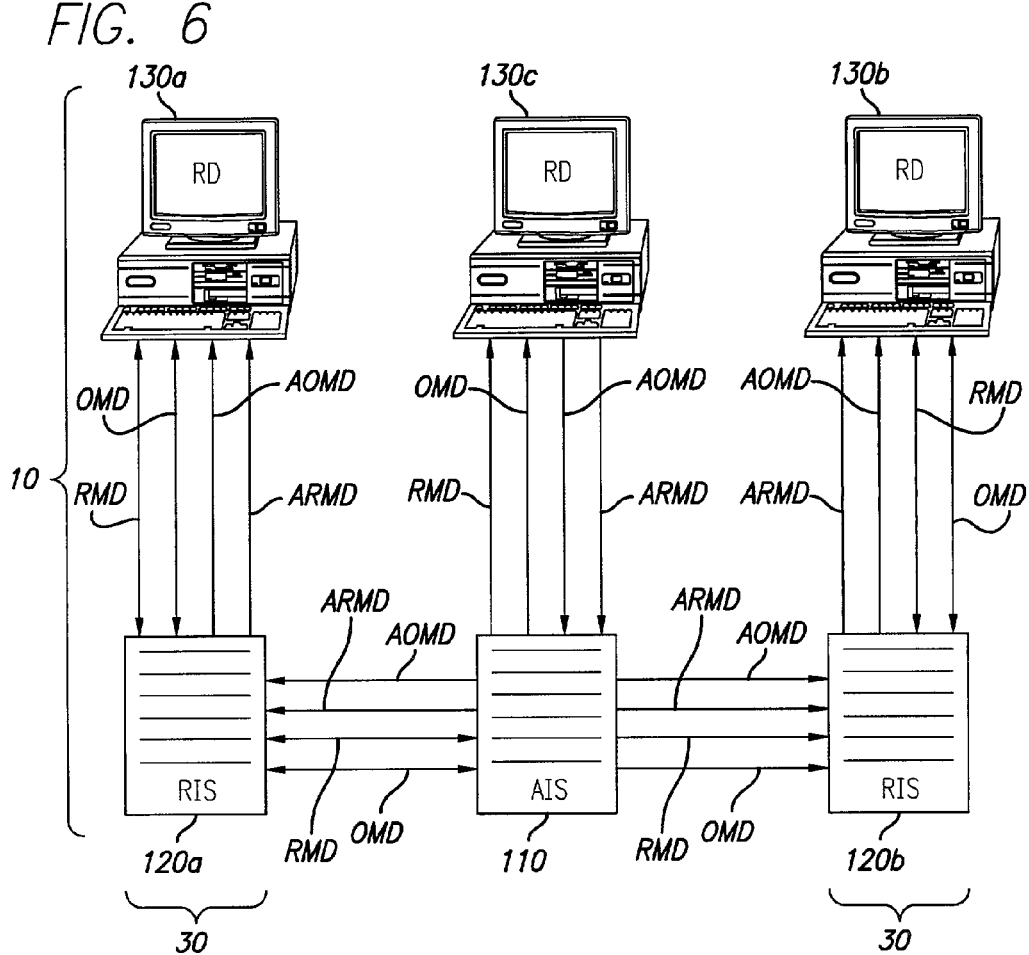
FIG. 6 illustrates a communication layer of another embodiment of the aggregated information system of the present invention.

FIG. 6 illustrates a communication layer of another embodiment of the aggregated information system of the present invention. In this embodiment, the aggregating application 114 is further adapted to receive additional response message data (ARMD), such as a response message responding to a previously posted new message, and additional original message data (AOMD), such as a new message, from the communicating reception device 130c. This received message data (i.e., ARMD, AOMD) is then stored on the memory device 116 (see FIG. 2), such that it can be provided to another reception device (not shown) that may be communicating with the aggregated information system 110. The received message data (i.e., ARMD, AOMD), along with the previously retrieved message data (i.e., OMD, RMD), may also be provided to at least one remote information system (e.g., 120a, 120b), such that it can be provided to at least one corresponding reception device (e.g., 130a, 130b) upon request.

To further illustrate how this embodiment of the aggregated information system 110 may operate within the aggregated assembly 10, the following illustrative example is provided. Referring to FIG. 6, two reception devices 130a, 130b are communicating with corresponding remote information systems 120a, 120b, as previously described. During this communication, the two reception devices 130a, 130b may be provided with previously posted new messages (i.e., OMD) and responses (i.e., RMD) to those new messages. Also during this communication, the two reception devices 130a, 130b may be allowed to submit new messages (i.e., OMD) and responses (i.e., RMD) to previously posted messages. As previously mentioned, this form of providing and receiving message data is consistent with typical bulletin boards found in the prior art.

In this embodiment of the present invention, the aggregated information system 110 also communicates with these remote information systems 120a, 120b, as well as at least one communicating reception device 130c. The aggregating application 114 (see FIG. 2) operating on the aggregated information system 110 is adapted to retrieve the previously posted new messages (i.e., OMD) and the previously posted response messages (i.e., RMD) contained on the remote information system 120a regardless of whether those messages were posted by the reception device 130a or some other reception device (not shown). These retrieved messages (i.e., OMD, RMD) can then be provided to the communicating reception device 130c. This allows the communicating reception device 130*c* to view message data (i.e., OMD, RMD) that was previously posted on the remote information system 120*a* as well as message data that was previously posted on the aggregated information system 110.

The communicating reception device 130*c* can then submit new messages (i.e., AOMD) or responses (i.e., ARMD) to any previously posted messages (i.e., OMD, RMD) to the aggregating application 114 operating on the aggregated information system 110. These submitted messages (i.e., AOMD, ARMD) are then stored on the memory device 116, such that they may be provided to any other reception device (not shown) that may be communicating with the aggregated information system 110. These submitted messages (i.e., AOMD, ARMD), along with the previously retrieved messages (i.e., OMD, RMD), may also be provided to the remote information systems 120*a*, 120*b*. This would allow the reception device 130*b* to view the message data (i.e., OMD, RMD) that was previously posted on the remote information systems 120*a*, 120*b*, as well as message data (i.e., AOMD, ARMD) that was previously posted on the aggregated information system 110.

In summation, the communicating reception device 130*c* will have access to message data that is stored on the aggregated information system 110, as well as message data that is stored on the remote information system 120*a*. Additionally, the message data posted by the communicating reception device 130*c* may be seen by any one of the reception devices communicating with the aggregated information system 110 or the remote information systems 120*a*, 120*b*. It should be appreciated that although the aggregated information system 110 appears to duplicate the message data contained on the plurality of information systems (i.e., remote information systems 120 and aggregated information system 110), an aggregated information system 110 containing a larger or smaller amount of message data than any one of the remote information systems 120 is within the spirit and scope of this invention.

In another embodiment of the present invention, the aggregating application 114 is further adapted to add advertisement data to the message data (i.e., OMD, RMD, AOMD, ARMD) before it is sent to any one of the remote information systems 120*a*, 120*b*. It should be appreciated that the advertisement data may include, but is not limited to, static advertisement data and active advertisement data. Static advertisement data is an advertisement that provided a user with textual, graphical, audio, or video advertisement data without requiring the user to interact with the advertisement to receive such data. Active advertisement data is an advertisement that provides a user with additional advertisement data when that user interacts with the advertisement. An active advertisement may further provide a user with textual, graphical, audio, or video advertisement data regardless of whether the user interacts with the advertisement. It should be appreciated that the advertisement data (or additional advertisement data) may be directed toward the aggregated information system 110 or a third party. For example, in an effort to advertise the aggregating information system 110, an active advertisement containing a hyper-link (i.e., a navigational link from one document to another) to the aggregated information system's Web-site may be placed within the message data (i.e., OMD, RMD, AOMD, ARMD) that is being directed toward a remote information system (e.g., 120*a*). This would allow a user of the remote information system (e.g., 120*a*) to be transported directly to the aggregated information system's Web-site by interacting with the active advertisement contained within the message data. Thus, the message data retrieved from one remote information system (e.g., the OMD and RMD retrieved from the remote information system 120*a*) may further be provided back to that same remote information system (e.g., 120*a*) in order to advertise in that forum.

The original message data (OMD) and the response message data (RMD) are retrieved from a pre-defined group of remote information systems 120. In order to define the pre-defined group of remote information systems 120, the aggregating application 114 may further include a search application (not shown). The search application searches wide area networks, such as the Internet, for pre-defined search criteria pertaining to relevant remote information systems 120. The pre-defined search criteria may be submitted by a managing user or at least one of the users operating the plurality of reception devices 130. Techniques for using search criteria to search for data over a wide area network, such as the Internet, are well known in the art, and thus not described herein.

Instead of (or in addition to) searching for relevant remote information systems 120, address location data corresponding to remote information systems 120 may be submitted by a managing user or at least one of the users operating the plurality of reception devices 130. Any one of these users may enter the address location data of a relevant remote information system 120 containing relevant message data (i.e., OMD, RMD). These users may further define the pre-defined group of remote information systems 120 by nominating and/or voting for particular remote information systems 120 that are operating on a wide area network, such as the Internet. This nominating and voting process is further explained in the related U.S. patent application entitled "METHOD, APPARATUS AND SYSTEM FOR HOSTING INFORMATION EXCHANGE GROUPS ON A WIDE AREA NETWORK," filed on Aug. 21, 2000, Ser. No. 09/648,474, which is incorporated herein, in its entirety, by reference.

Once the pre-defined group of remote information systems 120 are identified, the aggregating application 114 (or search application) can use topical search criteria to identify and retrieve relevant message data (i.e., OMD, RMD) contained within the predefined group of remote information systems 120. This topical search criteria may be submitted by a managing user or at least one of the users operating the plurality of reception devices 130. As explained above, techniques for using search criteria to search for data over a wide area network, such as the Internet, are known in the art, and thus not described herein.

Figure 7:
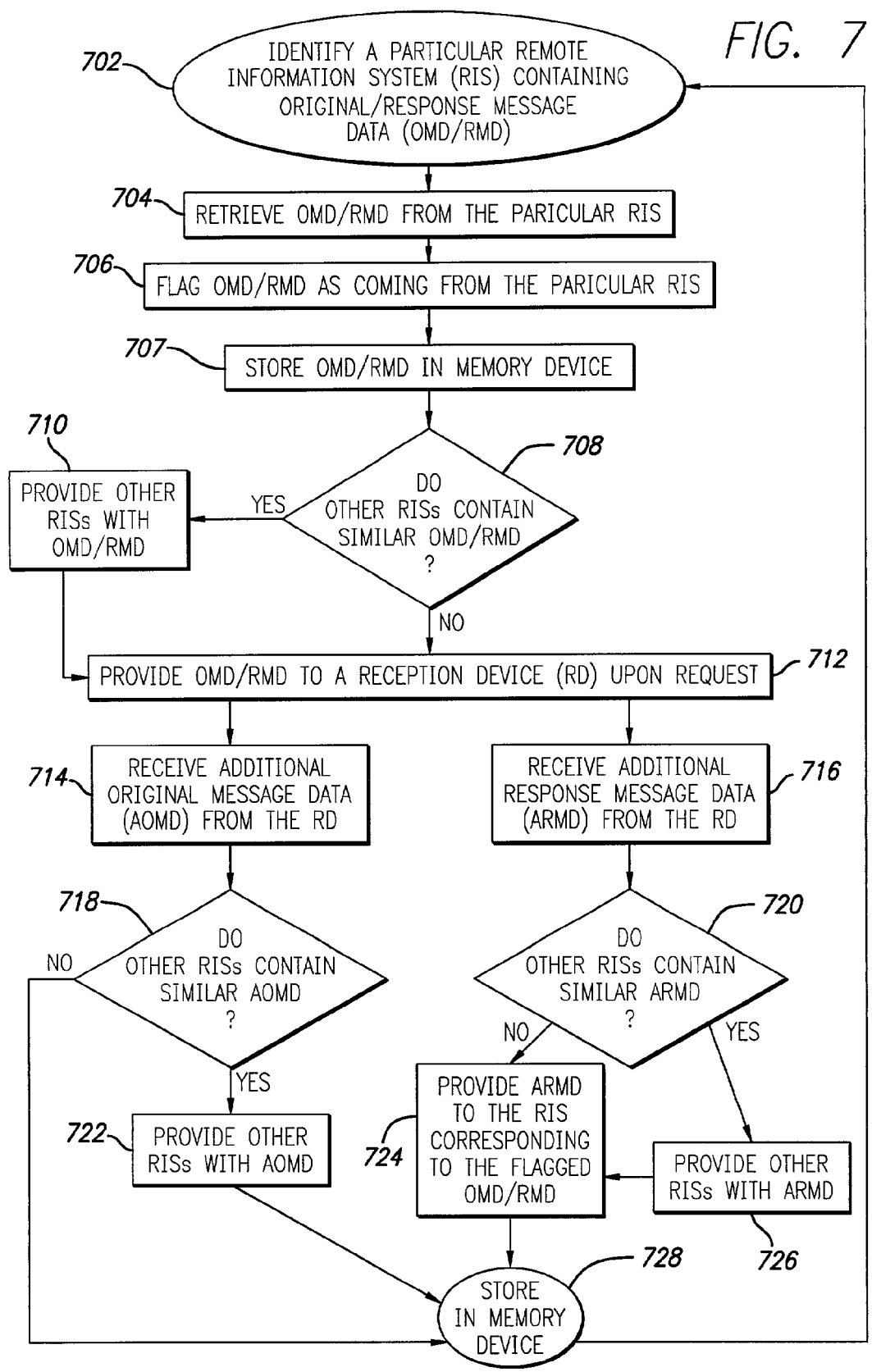
FIG. 7 is a flow diagram illustrating how the aggregated information system depicted in FIG. 6 receives and provides message data.

FIG. 7 is a flow chart illustrating how one embodiment of the aggregating application 114 operating on the aggregated information system 110 can be used to communicate with at least one reception device 130 and a plurality of remote information systems 120. At step 702, the aggregating application identifies a relevant remote information system (RIS) that may contain original message data (OMD) or response message data (RMD). Once the remote information system is identified, then the aggregating application (or search application) can search for, and retrieve relevant original message data (OMD) or relevant response message data (RMD) at step 704. Once the message data (i.e., OMD, RMD) has been received, it is flagged at step 706 to indicate which particular remote information system it originated from. At step 707, the original message data (OMD) or the response message data (RMD), along with the flag data, is stored in the memory device operating on the remote information system. At step 708, the aggregating application must determine whether there are any other remote information systems (RISs) available that contain similar original message data (OMD) or similar remote message data (RMD). If the answer is YES, then the retrieved message data (i.e., OMD, RMD) is provided to the other remote information systems at step 710.

The retrieved message data is then provided to a communicating reception device at step 712. Back at step 708, if the answer is NO, then the retrieved message data (i.e., OMD, RMD) is provided directly to the communicating reception device at step 712. The aggregating application is then adapted to receive additional original message data (AOMD), such as a new message, from the communicating reception device, or additional response message data (ARMD), such as a response message to the previously provided message data, from the communicating reception device.

At step 714, if the communicating reception device provides additional original message data (AOMD), such as new message data, then the aggregating application, at step 718, must determine whether there are any remote information systems that contain similar message data. If the answer is YES, then those remote information systems are provide with the additional original message data (AOMD) at step 722. The additional original message data (AOMD) is then stored in a memory device operating on the aggregating information system at step 728. Back at step 718, if the answer is NO, then the additional original message data (AOMD) is stored directly in the memory device operating on the aggregated information system at step 728. Back at step 716, if the reception device provides additional response message data (ARMD), such as a response message to the previously provided message data, then the aggregating application, at step 720, must determine whether there are any other remote information systems (other than the flagged remote information system) that contain similar message data. If the answer is YES, then those remote information systems are provided with the additional response message data (ARMD) at step 726. The additional response message data (ARMD) is then provided at step 724 to the flagged remote information system identified in step 706. Back at step 720, if the answer is NO, then the additional response message data (ARMD) is provided directly at step 724 to the flagged remote information system identified in step 706. The additional response message data (ARMD) is then stored in the memory device operating on the aggregated information system at step 728.

Having thus described a preferred embodiment of a system and method for aggregating information from a plurality of remote information systems, such as bulletin boards, over a wide area network, it should be apparent to those skilled in the art that certain advantages of the system have been achieved. It should also be appreciated that various modifications, adaptations, and alternative embodiments thereof may be made within the scope and spirit of the present invention. The invention is further defined by the following claims.

What is claimed is:

1. A computer-implemented method for exchanging information, the method comprising:
   by a computer system comprising computer hardware:
      aggregating contents of pre-existing forums for exchanging messages relating to a topic present on a plurality of servers;
      flagging the aggregated contents to indicate the server from which the content originated;
      providing the aggregated contents to at least one of the plurality of servers;
      providing the aggregated contents to an end user;
      receiving a response to a message of one of said pre-existing forums included in said aggregated contents from the end user;
      transmitting the response for posting on the one of said pre-existing forums to the server from which the message originated;
      automatically determining additional servers from the plurality of servers that contain message data similar to the response; and
      transmitting the response to the additional servers.

2. The method of claim 1, wherein the pre-existing forums comprise one or more bulletin boards.

3. The method of claim 1 further comprising adding advertisement data to said response before said response is transmitted to the server from which the message originated.

4. The method of claim 1, wherein said plurality of servers are selected by a managing user.

5. The method of claim 1, wherein said plurality of servers are selected by a voting process.

6. The method of claim 1 further comprising storing the aggregated contents in a memory device.

7. The method of claim 1, wherein said plurality of servers are selected by a nomination process.

8. The method of claim 3, wherein said advertisement data comprises an advertisement for a website associated with the computer system.

9. The method of claim 8, wherein said advertisement includes a hyperlink to the website to enable users of said plurality of servers to navigate to the website.

10. A computing system comprising:
    a computing device; and
    a computer readable medium storing machine-executable instructions including one or more modules configured for execution by the computing device in order to cause the computing system to:
       aggregate contents of forums for exchanging messages relating to a topic present on a plurality of servers;
       flag the aggregated contents to indicate the server from which the content originated;
       provide the aggregated contents to an end user;
       receive a response to a message of one of said forums from the end user;
       transmit the response for posting on the one of said forums to the server from which the message originated;
       determine additional servers from the plurality of servers that contain message data similar to the response; and
       transmit the response to the additional servers.

11. The system of claim 10, wherein the forums comprise one or more bulletin boards.

12. The system of claim 10, wherein the one or modules are further configured to cause the computing system to add advertisement data to said response before said response is transmitted to the server from which the message originated.

13. The system of claim 10, wherein said plurality of servers are selected by a managing user.

14. The system of claim 10, wherein said plurality of servers are selected by a voting process.

15. The system of claim 10, wherein the one or modules are further configured to cause the computing system to store the aggregated contents in a memory device.

16. The system of claim 10, wherein said plurality of servers are selected by a nomination process.

17. The system of claim 12, wherein said advertisement data comprises an advertisement for a website associated with the computing system.

18. The system of claim 17, wherein said advertisement includes a hyperlink to the website to enable users of said plurality of servers to navigate to the website.

19. The system of claim 17, wherein the one or modules are further configured to cause the computing system to provide the aggregated contents to at least one of the plurality of servers.

20. A tangible computer-readable medium encoded with instructions encoded thereon, wherein the instructions are readable by a computing device in order to cause the computing device to perform operations comprising:
- aggregating contents of forums for exchanging messages present on a plurality of servers;
- providing the aggregated contents to at least one of the plurality of servers;
- providing the aggregated contents to an end user;
- receiving a response to a message of one of said forums from the end user;
- determining a subset of servers from the plurality of servers that contain message data similar to the response; and
- transmitting the response to the subset of servers.

21. The tangible computer-readable medium of claim 20, wherein the forums comprise one or more bulletin boards.

22. The tangible computer-readable medium of claim 20 further encoded with instructions to cause the computing device to add advertisement data to said response before said response is transmitted to the subset of servers.

23. The tangible computer-readable medium of claim 20, wherein said plurality of servers are selected by a managing user.

24. The tangible computer-readable medium of claim 20, wherein said plurality of servers are selected by a voting process.

25. The tangible computer-readable medium of claim 20 further encoded with instructions to cause the computing device to store the aggregated contents in a memory device.

26. The tangible computer-readable medium of claim 20, wherein said plurality of servers are selected by a nomination process.

27. The tangible computer-readable medium of claim 22, wherein said advertisement data comprises an advertisement for a website associated with the computing device.

28. The tangible computer-readable medium of claim 27, wherein said advertisement includes a hyperlink to the website to enable users of said plurality of servers to navigate to the website.

\* \* \* \* \*